United States Patent
Erdman

(10) Patent No.: US 9,889,617 B2
(45) Date of Patent: Feb. 13, 2018

(54) APPARATUS AND METHOD FOR RETREADING TIRES

(71) Applicant: Alan Erdman, Mona Vale (AU)

(72) Inventor: Alan Erdman, Mona Vale (AU)

( * ) Notice: Subject to any disclaimer, the term of this patent is extended or adjusted under 35 U.S.C. 154(b) by 349 days.

(21) Appl. No.: 14/365,884

(22) PCT Filed: Dec. 14, 2012

(86) PCT No.: PCT/AU2012/001533
§ 371 (c)(1),
(2) Date: Jun. 16, 2014

(87) PCT Pub. No.: WO2013/086577
PCT Pub. Date: Jun. 20, 2013

(65) Prior Publication Data
US 2014/0353862 A1    Dec. 4, 2014

(30) Foreign Application Priority Data

Dec. 16, 2011    (AU) .................................. 2011905259

(51) Int. Cl.
| | | |
|---|---|---|
| *B29D 30/54* | (2006.01) | |
| *B29C 64/10* | (2017.01) | |
| *B29C 64/20* | (2017.01) | |
| *B60C 11/02* | (2006.01) | |
| *B29C 64/106* | (2017.01) | |
| *B29C 67/00* | (2017.01) | |
| *B33Y 80/00* | (2015.01) | |
| *B29K 75/00* | (2006.01) | |

(52) U.S. Cl.
CPC ............ *B29D 30/54* (2013.01); *B29C 64/106* (2017.08); *B29C 64/20* (2017.08); *B29C 67/0055* (2013.01); *B29C 67/0085* (2013.01); *B33Y 80/00* (2014.12); *B60C 11/02* (2013.01); *B29D 2030/541* (2013.01); *B29D 2030/545* (2013.01); *B29D 2030/546* (2013.01); *B29K 2075/00* (2013.01)

(58) Field of Classification Search
CPC ........ B29D 30/00; B29D 30/54; B29D 30/58; B29C 67/0051; B29C 64/00; B29C 64/10; B29C 64/106; B29C 64/112; B29C 64/124; B29C 64/20; B29C 64/205; B29C 64/209; B29C 64/241; B29C 64/386; B29C 64/393; B60C 11/02
USPC ........................................ 152/209.6; 700/120
See application file for complete search history.

(56) References Cited

FOREIGN PATENT DOCUMENTS

WO    WO 2011/011818    *    2/2011

\* cited by examiner

*Primary Examiner* — Eric Hug
(74) *Attorney, Agent, or Firm* — Panitch Schwarze Belisario & Nadel LLP

(57) ABSTRACT

The present invention relates to an apparatus (10) and a method for retreading a tire (16) having a worn surface (12). The worn surface (12) is made of a thermoplastic elastomer. The apparatus (10) includes a heater (34) and a 3D printer (18). The heater (34) is adapted to heat up the worn surface (12) to a desired temperature. The 3D printer (18) is adapted to lay one or more layers of the thermoplastic elastomer onto the heated worn surface (12). The or each layer of thermoplastic elastomer is capable of adhering to the heated worn surface (12) or previously laid layer without requiring an adhesive medium or agent.

20 Claims, 3 Drawing Sheets

APPARATUS AND METHOD FOR RETREADING TIRES

CROSS-REFERENCE TO RELATED APPLICATION

This application is a Section 371 of International Application No. PCT/AU2012/001533, filed Dec. 14, 2012, which was published in the English language on Jun. 20, 2013, under International Publication No. WO 2013/086577 A1, and the disclosure of which is incorporated herein by reference.

TECHNICAL FIELD

The present invention broadly relates to an apparatus and method for retreading tyres. In particular, this invention relates to an apparatus and method for treading or retreading worn tyres using 3D printing technologies.

BACKGROUND OF THE INVENTION

Conventionally, when the treads of a tyre are worn to a certain degree, the grip of the tyre on the road surface, especially when it is wet is significantly diminished. The worn tyre is then required to be removed from service due to safety concerns.

Instead of abandoning the worn tyre and replacing it with a new tyre, retreading is a significantly cheaper option. For this reason, retreaded tyres are widely used in automobiles as well as large-scale operations such as trucking, busing and commercial aviation. Retreading tyres is also a very environmentally friendly way of recycling used tyres.

Retreading tyres involves a remanufacturing process designed to extend the useful service life of tyres. Existing retreading process involves the physical removal of the tread pattern (known as buffing) and regluing of new treads back into the same positions. As the treads, side walls and other components of a tyre are commonly manufactured, and react to movement, as an integrated unit, the retreading process described above has a major shortcoming in that it substantially reduces the overall integrity and handling of the retreaded tyre. The retreading process described above also has another shortcoming in that if the retread portions failed and hence spun off the tyre, the underlying surface resulting from buffing is typically close to the steel belts that are embedded in the tyre. As such, re-exposure of the underlying surface can potentially lead to a sudden failure of the entire tyre, particularly when the tyre is operating at high speeds.

It is an object of the present invention to provide an apparatus and method for retreading tyres which may overcome or ameliorate the above shortcomings or at least provide a useful alternative.

SUMMARY OF THE INVENTION

According to a first aspect of the present invention, there is provided an apparatus for retreading a tyre having a worn surface made of a thermoplastic elastomer, the apparatus including:

a heater adapted to heat up the worn surface to a desired temperature; and a 3D printer adapted to lay one or more layers of the thermoplastic elastomer onto the heated worn surface;

wherein the or each layer of thermoplastic elastomer is capable of adhering to the heated worn surface or a previously laid layer without requiring an adhesive medium or agent In a preferred embodiment, the 3D printer utilises an additive manufacturing technology such as fused filament fabrication. Other technologies suitable for carrying out 3D printing including granular type printing such as selective heat sintering or selective laser sintering may be used by the 3D printer.

Preferably, the apparatus is adapted to reinstate a tread pattern by laying the one or more layers of thermoplastic elastomer.

Preferably, the 3D printer and tyre are in use displaceable relative to one another.

The surface may include an external circumferential surface and/or a lateral surface of the tyre.

In a preferred embodiment, the 3D printer includes one or more printheads arranged in one or more rows. The or each printhead is preferred to be adapted to lay the one or more layers of thermoplastic elastomer upon the tyre surface, as desired. Each printhead is preferred to be configured to function independently of one another. Laying of the or each layer of thermoplastic elastomer may be achieved by way of extrusion or any other suitable methods. Preferably, each layer of thermoplastic elastomer may be the same or different. For instance, one or more polymers or copolymers may be used to form one or more outer layers of the or each tread. These polymers or copolymers are preferred to have a range of wear and grip characteristics suitable for forming tyre tread. A softer but more adhesive material may be used to form one or more inner layers of the or each tread.

Preferably, the worn surface includes one or more worn treads. The 3D printer is preferred to be capable of laying the one or more layers of thermoplastic elastomer directly onto the or each worn tread without requiring the or each worn tread to be substantially removed or buffed away before printing. However, the or each worn tread is preferred to undergo surface preparation such as cleaning and roughening before printing takes place.

In a preferred embodiment, the apparatus includes a mapping means adapted to measure the topography of the worn surface. Preferably, the mapping means is in the form of a scanner which includes or is electronically connected to a processor which may be programmed to process the measured topography of the worn tread surface and control the 3D printer accordingly. More preferably, operation of the 3D printer is automated and dictated by the measured topography taking into account and compensating for the nonuniformity of the worn surface so as to reinstate a tread pattern. The processor may be set to allow the 3D printer to be controlled manually by a user for retreading a specific or confined worn area of the surface, for example.

The processor is preferred to be capable of monitoring the printing process and carrying out post printing examination, and correcting any defects if detected.

The processor may also be programmed to construct a desired new tread pattern building on the existing worn surface.

It is preferred that the apparatus includes a supporting structure adapted to movably hold the tyre in place during the printing process. The supporting structure is preferred to be capable of rotating the tyre about a first axis. In use, the tyre is preferred to be rotated incrementally while the 3D printer is fixed at a chosen location. The or each row of printheads is preferably configured to lay thermoplastic elastomer covering a strip of the circumferential surface of the tyre parallel to the first axis after each incremental rotation. Preferably, the strip is substantially parallel to the first axis. As such, the entire circumferential surface is preferred to be substantially covered on completion of a full 360-degree rotation of the tyre. Upon completion of each full revolution, the or each print head is preferred to be moved (upwards) along a second axis perpendicular to the first axis by a predetermined increment. The printing process is preferred to commence again once the or each printhead has moved into place. This process is preferably repeated until the desired tread depth is reached and the desired tread pattern reinstated.

In a preferred embodiment, the apparatus includes a mechanism adapted to apply pressure to the casing before printing takes place such that the physical and adhesive properties of the tyre surface are enhanced. This mechanism is preferred to consist of an air flow control unit. In combination with the pressure mechanism, the heater may be adapted to provide an adjustable temperature range to facilitate the adhesion of the printed material to the existing worn tread. The air flow control unit is adapted to generate compressed air for applying pressure on the casing and create a vacuum for removal of dust and dirt from the tyre surface. This mechanism may also be capable of carrying out other tasks, such as curing as a subsequent or final step.

Preferably, the apparatus also includes a preparation device adapted to apply one or more chemicals to the tyre surface for cleaning purposes. The chemicals may include a solvent in the form of a spray. In a preferred embodiment, the preparation device also includes a means adapted to prepare the tyre surface for retreading. The means is preferred to be capable of roughening a selected area of the tyre surface to facilitate adhesion of a first layer of thermoplastic elastomer to the prepared tyre surface. For example, the means may be a sander.

It is preferred that the preparation device, mapping means, heater, supporting structure and printheads are in communication with and under the control of the processor which is programmable to achieve full automation.

Preferably, the thermoplastic elastomer is thermoplastic polyurethane.

According to a second aspect of the present invention, there is provided an apparatus for retreading a tyre having a worn surface, the apparatus including a 3D printer capable of laying one or more layers of material onto the worn surface in-situ.

According to a third aspect of the present invention, there is provided a method of retreading a tyre having a worn surface made of thermoplastic elastomer, the method including the steps of:

providing a heater adapted to heat up the worn surface to a desired temperature; and providing a 3D printer adapted to lay one or more layers of the thermoplastic elastomer onto the heated worn surface; and leaving the or each layer of thermoplastic elastomer to automatically adhere to the heated worn or previously laid layer without requiring an adhesive medium or agent.

Preferably, the method includes a step of displacing the 3D printer and tyre relative to one another.

The method does not require a step of substantially removing or buffing away any part of the worn surface or undertread before laying the one or more layers of thermoplastic elastomer onto the worn surface. It should be noted that removal or buffing away of the worn surface does not include any minor treatments on or preparation of the tyre surface such as roughening or sanding.

BRIEF DESCRIPTION OF THE DRAWINGS

The invention may be better understood from the following non-limiting description of the present invention, in which.

DETAILED DESCRIPTION OF THE DRAWINGS

Figure 1:
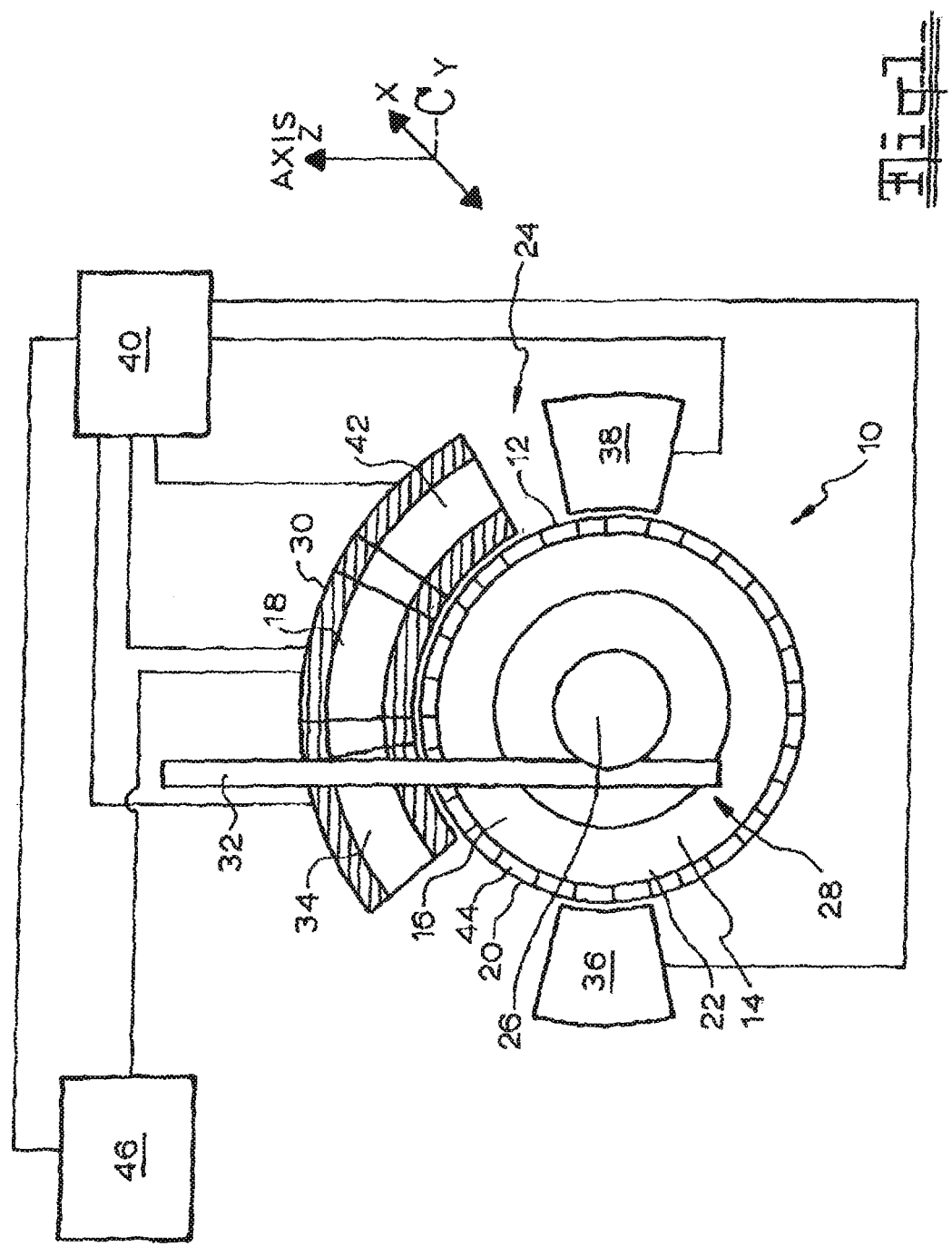
FIG. 1 is a cross sectional view of a tyre retreading apparatus in accordance with a preferred embodiment of the present invention.

Referring to FIG. 1, an apparatus 10 for retreading a used tyre 16 having a casing 14 with a surface 12 includes a 3D printer 18 capable of laying layers of thermoplastic elastomer onto the casing surface 12. The casing surface 12 has a plurality of worn treads. The 3D printer 18 and tyre 16 are in use displaceable relative to one another. Further detail of this will be described below.

It should be noted that the surface 12 includes an external circumferential surface 20 and/or a lateral surface 22 of the tyre 16.

It should be appreciated that the apparatus 10 is intended to be used to retread the used tyre 16 having a worn surface 12 having worn treads. By way of example, the tyre 16 described in the present specification is a used tyre with a worn tread surface 12 (although the irregularly worn tread surface 12 is not readily visible in FIG. 1). The 3D printer 18 is capable of laying multiple layers of thermoplastic elastomer directly onto the worn tread surface 12 without requiring the pre-existing worn treads to be substantially buffed away or removal by any other means before printing.

The apparatus 10 has a supporting structure 24 with a rotor 26. A wheel 28 with a tyre 16 is mounted onto the rotor 26 which movably holds the tyre in place. The wheel 28 (and hence tyre 16) is driven by the rotor 26 in operation to rotate about the x-axis (see FIG. 1).

The 3D printer 18 is contained within a housing 30 which is movably supported by a column 32 which in turn is operatively connected to the rotor 26. The print material which is a polymer or copolymer is contained in a receptacle 46. In operation, the housing 30 carrying the 3D printer 18 is lowered along the z-axis (see FIG. 1) to a selected level such that there exists a little gap between the housing 30 and the tyre surface 12. The tyre 16 in use is driven by the rotor 26 to rotate about the x-axis.

As shown in FIG. 1, the apparatus 10 has a mechanism which consists of a air flow control unit 36. There is also a heater 34 which is provided to apply heat to the casing 14 whereas the air flow control unit 36 is configured to apply pressure on the casing 14 by blowing compressed air. The heater 34 is adjustable to heat up the worn surface 12 of the tyre 16 to a desired temperature progressively. The heater 34 and air flow control unit 36 can be activated to apply specific heat and pressure over a period of time to the tyre surface 12 such that the physical properties of the compounds that constitute the tyre tread are enhanced. As a result, adhesion of the additional layers to be printed onto the tyre tread may be significantly improved.

The apparatus 10 also has a preparation device 38 which can apply selected chemicals to the tyre surface for cleaning purposes. The chemicals may include a liquid spray and/or an abrasive solvent. Although not shown in FIG. 1, the preparation device also has a means capable of preparing the tyre surface 12 for retreading. The means may be a sander or filer with abrasive capability which functions to roughen a selected area of the tyre surface 12 to facilitate adhesion of one or more layers of thermoplastic elastomer to the prepared tyre surface. Additionally, the air flow unit 36 may be put into a vacuum mode so as to facilitate removal of dust and dirt from the tyre surface 12.

It should be noted that the preparation device 38, the mechanism for applying heat and pressure, and the supporting structure 24 are all in communication with and under the control of a central processor 40 which is programmable to achieve full automation.

Referring to FIG. 1, the apparatus 10 has a mapping means in the form of a scanner 42 which is capable of measuring the topography of the worn tyre surface 12. The scanner 42 is electronically connected to a processor which may be programmed to process the measured topography of the worn tread surface 12 and control the 3D printer accordingly. In operation, the scanned information is relayed to the central processor 40 where calibration calculations are made for 3D printing. Operation of the 3D printer 18 is automated and dictated by the measured topography taking into account and compensating for the nonuniformity of the worn tread surface 12 so as to reinstate the original tread pattern. The central processor 40 may be set to allow the 3D printer 18 to be controlled manually by a user for retreading a specific or confined worn tread surface 12.

In use, the 3D printer 18 starts with laying down new treads in a transverse line parallel to the x-axis across the tyre surface 12. Upon completion of one line of printing, the tyre 16 is rotated incrementally while the 3D printer 18 is fixed at the chosen location. Once the tyre 16 has rotated by a predetermined increment, another line of print is then laid down by the 3D printer 18. The incremental rotational process continues for a full 360-degree revolution until the entire tyre surface 12 is covered. Upon completion of each full revolution, the 3D printer 18 is moved up along the column 32 which is parallel to the z-axis by a predetermined increment. The printing process commences again once the 3D printer 18 has moved into place. This process is repeated until the desired tread depth is reached and the tread pattern reinstated. The central processor 40 is capable of monitoring the printing process and carrying out post printing examination, and correcting any defects if detected.

Figure 2:
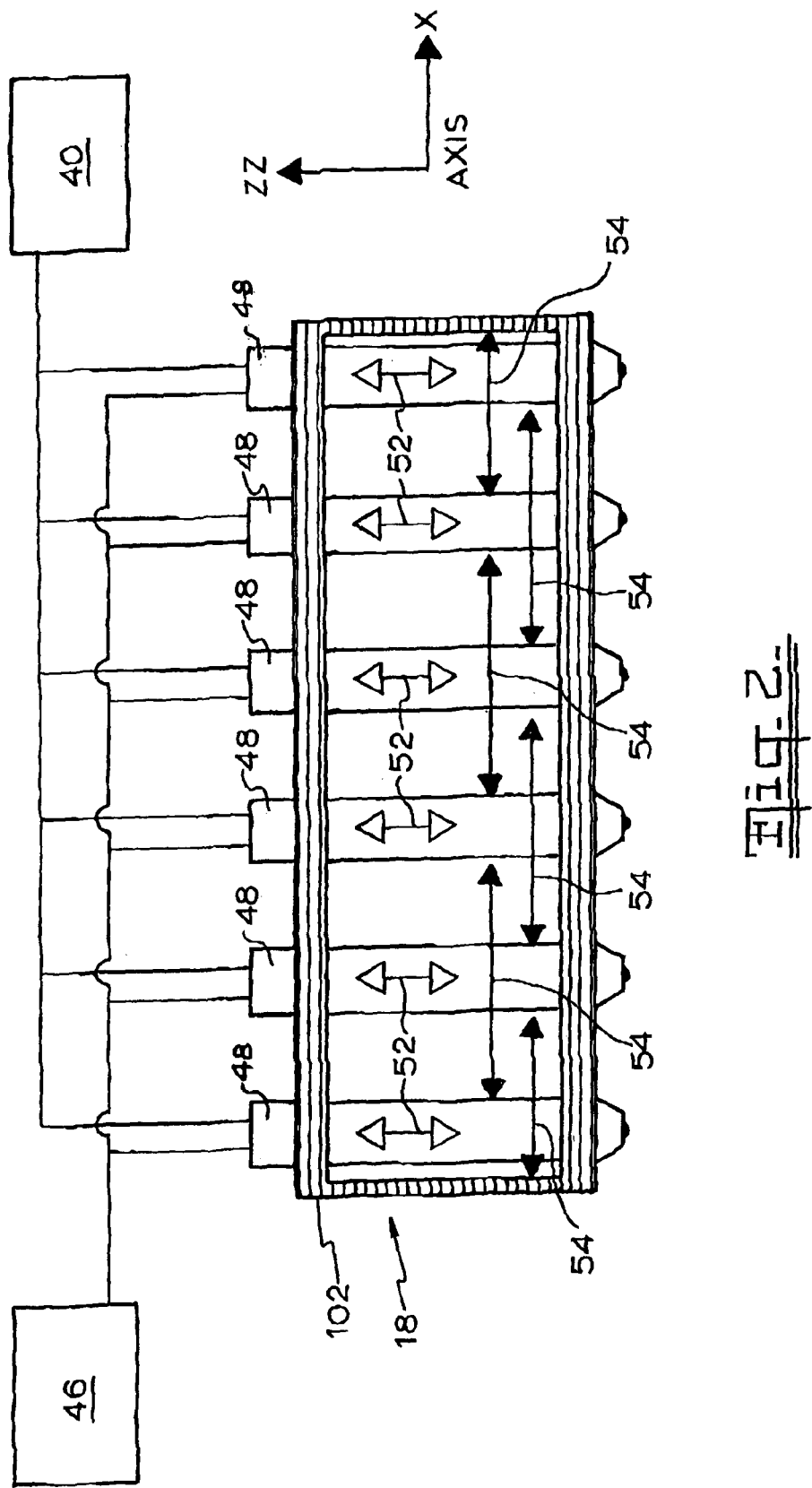
FIG. 2 is a front view of a 3D printer being part of the apparatus of FIG. 1.

Turning to FIG. 2, the 3D printer 18 has a series of printheads 48. The printheads 48 are arranged in a row and configured to lay material covering a strip of the circumferential surface of the tyre after each incremental rotation of the tyre about the x-axis. Laying of the layers of material is achieved by way of extrusion. Each printhead 48, is configured to lay one or more layers of material upon the tyre surface 12, as desired. Each printhead 48, is configured to function and move independently of one another as an individual unit. Each printhead 48, can be moved and repositioned individually and independently across the width of the tyre 16 along the x-axis as indicated by arrows 54. Also, each printhead 48 can be moved up or down relative to the tyre surface 12 along the zz-axis indicated by arrows 52. Furthermore, any one of the printheads 48 can be removed from the printer 18 and service without affecting the operation of the remaining ones. The arrangement of the printheads 48 enables rapid adaption of the printer 18 to suit different tyre designs and characteristics in regards to camber, width and tread profile.

Figure 3:
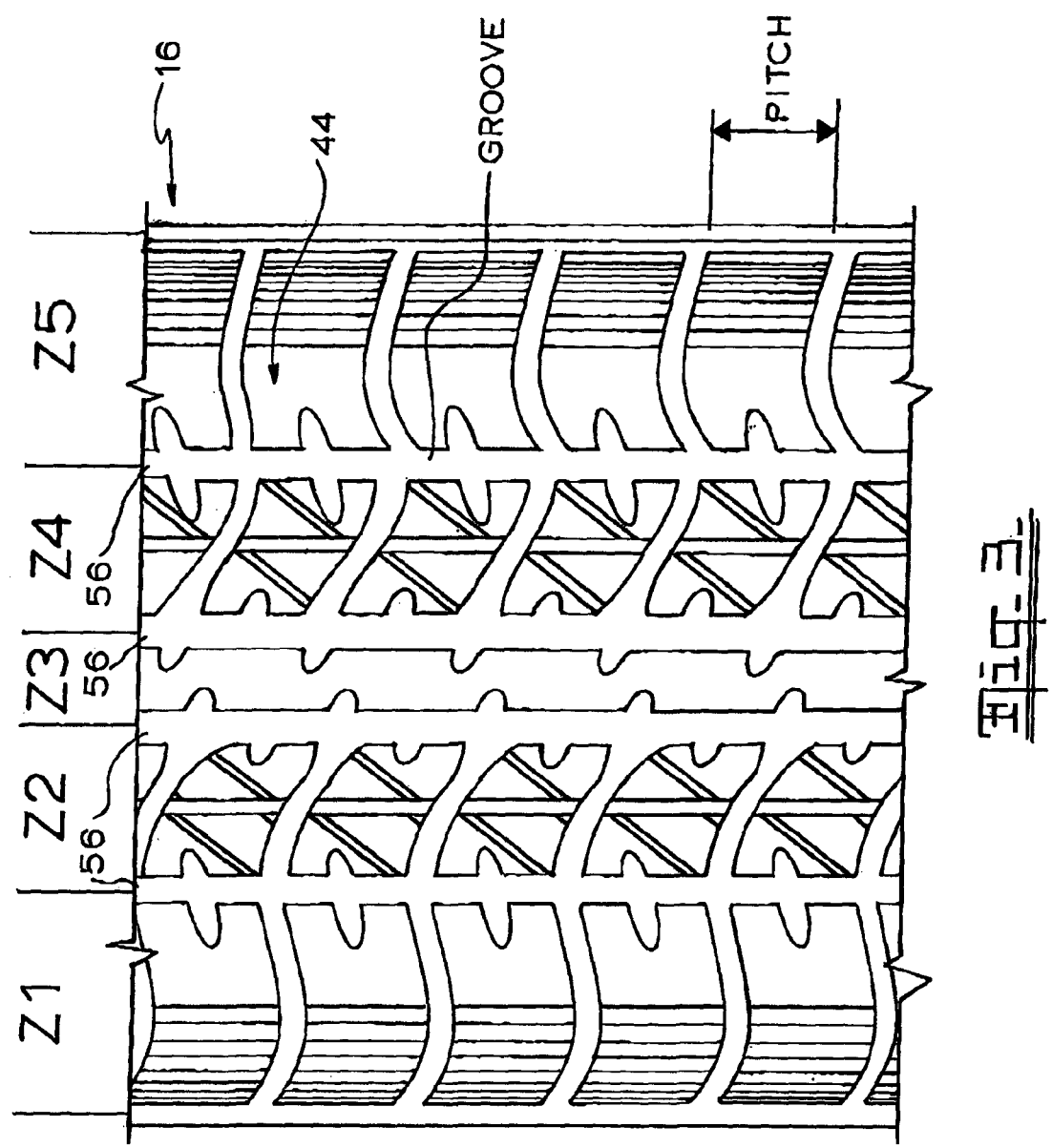
FIG. 3 is a top end view of a tyre retreaded by the apparatus of FIG. 1.

Referring to FIG. 3, the tyre 16 has tread pattern 44 which is divided up into five different zones Z1 to Z5, each of which being a raised section running in a continuous and repeated fashion around the circumference of the tyre 16. Each zone Z1, Z2, Z3, Z4, Z5 is separated from the adjacent one by a deep groove 56. The shape and width of each zone may differ within the overall tread design on each individual tyre. Each printhead 48 is configured and arranged to be responsible for printing on a corresponding zone which is achieved through its movement along the x- and zz-axes independent from the movement of the adjacent printheads. For example, the printhead 48 covering zone Z3 would be printing over a relatively small section while adjacent printhead 48 covering zone Z2 is printing over a larger area. It will be appreciated that the multiple printhead arrangement offers the advantage of making the printing process quicker by eliminating the need of a single printhead having to keep stopping and starting printing as it transits from a raised tread to a groove and then to another raised tread.

It should be noted that the apparatus and method of the present invention is applicable to and dependent upon a specifically manufactured tyre with a tread layer made of a thermoplastic elastomer. The thermoplastic elastomer not only possesses the physical characteristics required for use as tread on pneumatic tyres but would also allow printing thereof by way of the Fused Filament Fabrication method. The use of thermoplastic elastomer in both the manufacture of the original tyre and the printing process would eliminate or at least minimise any adherence issues in the retreading process. The retreading process involves extrusion of the thermoplastic elastomer onto a heated base layer made of identical or at least similar material. When subjected to an appropriate amount of heat and/or pressure, the printed thermoplastic elastomer would by nature automatically bond to the worn tyre surface which in the specifically manufactured tyre is also a thermoplastic elastomer. As such, no intermediate or bonding layer is required. Also, such a retreading process would enable the tyre casing to be retreaded multiple times.

It will be appreciated that the specifically manufactured tyre referred to above only involves a modified tread layer. All of the other components that constitute the tyre casing including the sidewalls, bead etc. may be manufactured using existing tyre technology with conventional materials.

It is contemplated that thermoplastic polyurethane (TPU) is an ideal elastomer for use as a printing material. TPU has the ability to be effectively and consistently printed via the Fused Filament Fabrication process and possesses similar physical characteristics to the materials currently used for the tread of tyres. TPU also has a number of additional environmental benefits when compared to the vulcanised materials traditionally used in the manufacture of tyres.

As an option, a specifically fabricated tyre of the sort described above may include two or more different layers of tread, namely an outer layer being made of a material with similar characteristics to those commonly found on existing tyres and an inner layer made of a softer compound being located directly underneath the outer layer. The inner layer has a lower wear resistance compared with the outer layer but is more accepting of the outer layer which is laid on top of the inner layer in the printing process. Furthermore, the inner layer may have coloured lines or bars or other distinguishing features embedded at intervals around the circumference of the tyre 16. These colour lines or bars would be exposed once the outer layer is worn away thereby alerting an operator to the fact that the outer layer having the higher wear resistance has been worn away. This serves as an indicator that the tyre is due for retreading by 3D printing which does not require any buffing, peeling or removal of the pre-existing worn tread comprising the inner layer in the present case.

It is contemplated that the central processor of the apparatus may be programmed to construct a desired new tread pattern building on an existing inner layer described above.

In operation, the tyre 16 being mounted on the wheel 28 is secured onto the rotor 26 of the support structure 24. The preparation device 38 is then activated to prepare the worn surface of treads on the tyre 16. This involves treatments including cleaning and roughening of the worn surface. Once the tyre surface is prepared, the mapping means 42 is brought to close proximity to the tyre 16 and activated as the tyre 16 is driven by the rotor 26 to rotate. Topographic information of the tyre 16 obtained by the mapping means 42 is relayed to and stored in the central processor 40 which will lower the 3D printer 18 along the column 32 to an appropriate level for printing to take place. During the printing process, the printheads 48, being dictated by the processor 40, all operate independently and individually to lay different number of layers of material onto different areas of the tyre surface 12 based on the detected topographic information. The rotor 26 and the 3D printer 18 are synchronised such that by the time the tyre 16 has been rotated a full 360-degree, the desired tread pattern 44 of the tyre 16 is reinstated. The mapping means 42 is also actuated before printing commences such that the entire printing process is monitored. Also, a further scan may be performed by the mapping means 42 so as to ensure that correcting printing has been carried out. If no flaws or defects are detected, the 3D printer is elevated to a disengaging position such that the tyre 16 can be removed from the rotor 26. It will be appreciated that the apparatus 10 of the present invention is controlled and operated by automation with a high level of efficiency.

Now that a preferred embodiment of the present invention has been described in some detail, it will be apparent to those skilled in the art that the retreading apparatus may offer at least the following advantages:

1) it does not alter or interfere with the original construction of the casing thereby preserving the integrity of the tyre;
2) it does not require the steps of buffing and removing worn treads before retreading and hence reduces the cost of retreading;
3) in the event that the reprinted tread suffers from a failure or is stripped off due to improper use, design failures or application faults, the original construction of the casing would still be intact and retreading by 3D printing can be performed easily and swiftly;
4) it saves costs in that the abandonment of a huge amount of tyres can be avoided by reinstating tyres back to a serviceable condition with minimal polymeric material;
5) it is ecological due to a significantly reduction of the number of tyres that would otherwise end up in land fill, despite the fact that some tyres are recyclable; and
6) it enables in-situ retreading of tyres line by line and layer by layer;
7) it improves fuel efficiencies due to reduced rolling resistance of the tyre tread. As rolling resistance is reduced relative to the remaining tread depth, it is found to be economical in regards to fuel consumption to print small increments of tread depth but on a more regular basis.

Those skilled in the art will appreciate that the invention described herein is susceptible to variations and modifications other than those specifically described. For example, the tyre may be divided into more or less than five zones to suit tyres with different tread patterns. Also, the tyre may be rotated more than one revolution to ensure that the desired tread depth is achieved. Furthermore, each or all of the printheads 48 may be adjusted to move upwards or downwards in unison or individually and independently within the 3D printer 18 instead of having the 3D printer 18 being moved along column 32 as a whole. Besides, the apparatus may employ other forms of additive manufacturing techniques including granular type printing such as selective heat sintering or selective laser sintering where the extruder mechanism would be replaced by a granular deposition device and curing mechanism. Additionally, other thermoplastic elastomers including styrene-butadiene-styrene may also be used as printing material in the present invention, so long as they are able to be printed by 3D printing techniques and possess the characteristics required for use as tyre treads. All such variations and modifications are to be considered within the scope and spirit of the present invention the nature of which is to be determined from the foregoing description.

The invention claimed is:

1. An apparatus for retreading a tire having a worn surface, the apparatus comprising:
   a 3D printer adapted to lay at least one layer of thermoplastic elastomer onto the heated worn surface; wherein the at least one layer of thermoplastic elastomer is capable of adhering to the heated worn surface or a previously laid layer without requiring an adhesive medium or agent; and
   mapping means adapted to measure topography of the worn surface, the mapping means including or being electronically connected to a processor programmed to process the measured topography of the worn surface and control the 3D printer accordingly.

2. The apparatus of claim 1, which is adapted to reinstate a tread pattern by laying the at least one layer of thermoplastic elastomer.

3. The apparatus of claim 1, wherein the 3D printer and tire are in use displaceable relative to one another.

4. The apparatus of claim 1, wherein the worn surface includes an external circumferential surface and/or a lateral surface of the tire.

5. The apparatus of claim 1, wherein the 3D printer includes at least one printhead arranged in at least one row, each of the at least one printhead being adapted to lay the at least one layer of thermoplastic elastomer upon the tire surface.

6. The apparatus of claim 5, wherein each of the at least one printhead is configured to function independently of one another.

7. The apparatus of claim 1, wherein each of the at least one layer of thermoplastic elastomer is the same or different using at least one polymer or copolymer to form at least one outer layer of each tread.

8. The apparatus of claim 1, wherein each worn tread undergoes surface preparation before printing takes place.

9. The apparatus of claim 1, wherein operation of the 3D printer is automated and dictated by the measured topography taking into account and compensating for non-uniformity of the worn surface so as to reinstate a tread pattern.

10. The apparatus of claim 9, wherein the processor is capable of at least one of the following: monitoring the printing process, carrying out post printing examination, correcting any defects if detected, and being programmed to construct a desired Previously Presented tread pattern building on an existing worn surface.

11. The apparatus of claim 1, further comprising a supporting structure adapted to movably hold the tire in place during the printing process, the supporting structure being capable of rotating the tire incrementally about a first axis.

12. The apparatus of claim 11, wherein upon completion of each full revolution covering an entire circumferential surface of the tire, the at least one printhead is moved along a second axis perpendicular to the first axis by a predetermined increment.

13. The apparatus of claim 12, wherein the printing process is to commence again once the at least one printhead has moved into place and is repeated until a desired tread depth is reached and a desired tread pattern is reinstated.

14. The apparatus of claim 1, further comprising a heater adapted to provide an adjustable temperature range to facilitate adhesion of the at least one printed layer of thermoplastic elastomer to the worn surface.

15. The apparatus of claim 1, further comprising a preparation device adapted to apply at least one chemical to the tire surface for cleaning purposes, the preparation device including means capable of roughening a selected area of the tire surface to facilitate adhesion of a first layer of thermoplastic elastomer to the prepared tire surface.

16. The apparatus of claim 1, wherein the 3D printer utilizes an additive manufacturing technology including one of the following: fused filament fabrication, selective heat sintering and selective laser sintering.

17. The apparatus of claim 1, wherein the worn surface or the previously laid layer includes a tread layer made of a thermoplastic elastomer.

18. The apparatus of claim 17, wherein the tread layer of thermoplastic elastomer is in contact with another component of the tire made of either thermoplastic elastomer or any other conventional materials.

19. The apparatus of claim 1, wherein the worn surface is pre-heated to a desired temperature by a heating means.

20. A method of retreading a tire having a worn surface, the method comprising steps of:
    heating up the worn surface to a desired temperature;
    providing a 3D printer adapted to lay at least one layer of thermoplastic elastomer onto the heated worn surface; and
    leaving the at least one layer of thermoplastic elastomer to automatically adhere to the heated worn surface or a previously laid layer without requiring an adhesive medium or agent.

* * * * *